United States Patent
Brüstle et al.

[11] Patent Number: 5,284,399
[45] Date of Patent: Feb. 8, 1994

[54] CONNECTING FITTING

[75] Inventors: Klaus Brüstle, Höchst; Andreas Töfferl, Hard, both of Austria

[73] Assignee: Julius Blum Gesellschaft m.b.H., Höchst, Austria

[21] Appl. No.: 983,132

[22] Filed: Nov. 30, 1992

Related U.S. Application Data

[62] Division of Ser. No. 694,945, May 2, 1991, Pat. No. 5,207,526.

[30] Foreign Application Priority Data

May 7, 1990 [AT] Austria .................................. 1021/90

[51] Int. Cl.$^5$ .............................................. F16B 12/26
[52] U.S. Cl. .................................... 403/199; 403/240; 403/245; 403/321; 403/350
[58] Field of Search ................... 403/198-200, 403/192-193, 187-188, 230-231, 240, 245, 252-255, 262-264, 292-294, 296-298, 315-316, 320-322, 306, 350, 346, 375, 409.1, 22; 312/330.1

[56] References Cited

U.S. PATENT DOCUMENTS

| | | | |
|---|---|---|---|
| 2,837,365 | 6/1958 | Schlueter | 403/321 X |
| 3,339,954 | 9/1967 | Alvden | 403/322 |
| 3,574,420 | 4/1971 | Waldmann | 403/381 X |
| 4,042,307 | 8/1977 | Jarvis | 403/381 X |
| 4,353,663 | 10/1982 | Glickman | 403/230 |
| 4,458,965 | 7/1984 | Ohlendorf et al. | 403/321 X |
| 4,572,694 | 2/1986 | Hoeksema | 403/187 |
| 4,634,309 | 1/1987 | Dewey | 403/407.1 |
| 4,653,142 | 3/1987 | Upton | 403/350 X |
| 4,697,946 | 10/1987 | Rock et al. | 403/9 |
| 4,775,259 | 10/1988 | Shell | 403/187 X |
| 4,840,512 | 6/1989 | Rock et al. | 403/22 |
| 4,929,116 | 5/1990 | Mahl | 403/263 |
| 4,976,567 | 12/1990 | Spier | 403/407.1 |
| 4,984,929 | 1/1991 | Rock et al. | 403/230 |

FOREIGN PATENT DOCUMENTS

2033043 5/1980 United Kingdom .

*Primary Examiner*—Eric K. Nicholson
*Assistant Examiner*—Harry C. Kim
*Attorney, Agent, or Firm*—Wenderoth, Lind & Ponack

[57] ABSTRACT

A connecting fitting for securing a rail of a drawer to a rear or side wall thereof. A supporting member supports a rear end of the rail. A securing element is screwed into the rear end of the rail and includes a locking device by which the securing element is suspended in the supporting member. The supporting member has an open slot which widens in the manner of a keyhole into a receiving opening. A spring ring is located in the receiving opening, or the securing element is lockable in the receiving opening by friction or by locking elements.

8 Claims, 9 Drawing Sheets

CONNECTING FITTING

This is a divisional application of Ser. No. 07/694,945, filed May 2, 1991, now U.S. Pat. No. 5,207,526.

BACKGROUND OF THE INVENTION

The invention relates to a connecting fitting for securing a rail of a drawer to a rear wall thereof. The fitting includes a supporting member which can be secured to the rear or a side wall of the drawer and by which the rear end of the rail is supported. A securing element can be inserted into the rail, preferably by threaded engagement. A locking arrangement suspends the securing element in the supporting member and is inserted through an open slot in the supporting member.

In modern furniture construction, drawers are known in which a front panel can be secured adjustably to drawer frames by means of special holding devices. In some cases, there is provided on the drawer above each drawer frame a rail which extends from the front panel to the rear wall of the furniture unit or to a support secured to the rear wall of the furniture unit.

EU-A1-274084 discloses a connecting fitting in which a securing element is connected to a supporting member by a screw.

SUMMARY OF THE INVENTION

It is an object of the invention to improve such a connecting fitting for securing the rail at the end thereof remote from the front panel, and wherein the connecting fitting can be operated and employed without tools.

This object according to the invention is achieved in that slot in a supporting member widens in the manner of a keyhole into a receiving opening and a spring ring is located in the receiving opening, or a securing element is lockable in the receiving opening by friction or by locking elements.

Advantageously, the receiving opening is at least approximately circular, and the securing element includes a non-circular rotary bolt, e.g. oval in cross section, that may be locked in the receiving opening by frictional contact therebetween. The rotary bolt makes possible simple fixing of the rail without tools.

One embodiment provides for the circular receiving opening to be provided at opposite axial ends or edges thereof with teeth which extend in two spaced planes and delimit a slot-like receiver for a spring ring. This makes it possible for removal of the supporting member from a mold by means of simple mold tools if the supporting member is produced by injection molding or from plastics.

In an embodiment of the invention, the slot is open upwardly. As a result, the rail with the securing element can be mounted when the drawer is suspended by pressing the rail with the securing element into the supporting member part from above.

A further embodiment of the invention provides that the receiving opening has a rectangular configuration and that the securing element has a complementary cross-section. The securing element or the locking device, as appropriate, is suspended with a tapered section in the supporting member in the region of the slot therein and then is moved axially so that the securing element is held in the supporting member by engaging locking elements.

A still further embodiment of the invention that the securing element has spreadable portions and an axial channel which receives a spreading pin. The rail may be fixed by simply inserting the spreading pin. This is advantageous if there is no space available to turn a lever.

A yet further embodiment of the invention provides that the securing element has a groove into which snaps the spring ring. Thus, the rail is fixed automatically when the rear end thereof with the securing element is pressed into the supporting member.

An even further embodiment provides that projections or webs extend into the slot and engage in complementary grooves in the securing element. The securing part, which is screwed by means of a thread into a female thread of the rail, can be axially displaced by rotating the rail relative to the supporting member. Here also, fixing of the rail is possible without tools or pivoting of a lever.

Advantageously, the securing element has a lateral nose which projects into the slot. This facilitates removal of the rail from the supporting member.

BRIEF DESCRIPTION OF THE DRAWINGS

Embodiments of the invention are described in detail below with reference to the attached drawings, wherein:

FIGS. 20 and 21 are sections along line XX—XX in FIG. 19, respectively showing a securing element in an inside position and in a locking position;
and
FIGS. 22 an 23 show similar sections along line XXII—XXII of FIG. 18.

DETAILED DESCRIPTION OF THE INVENTION

Figure 1:
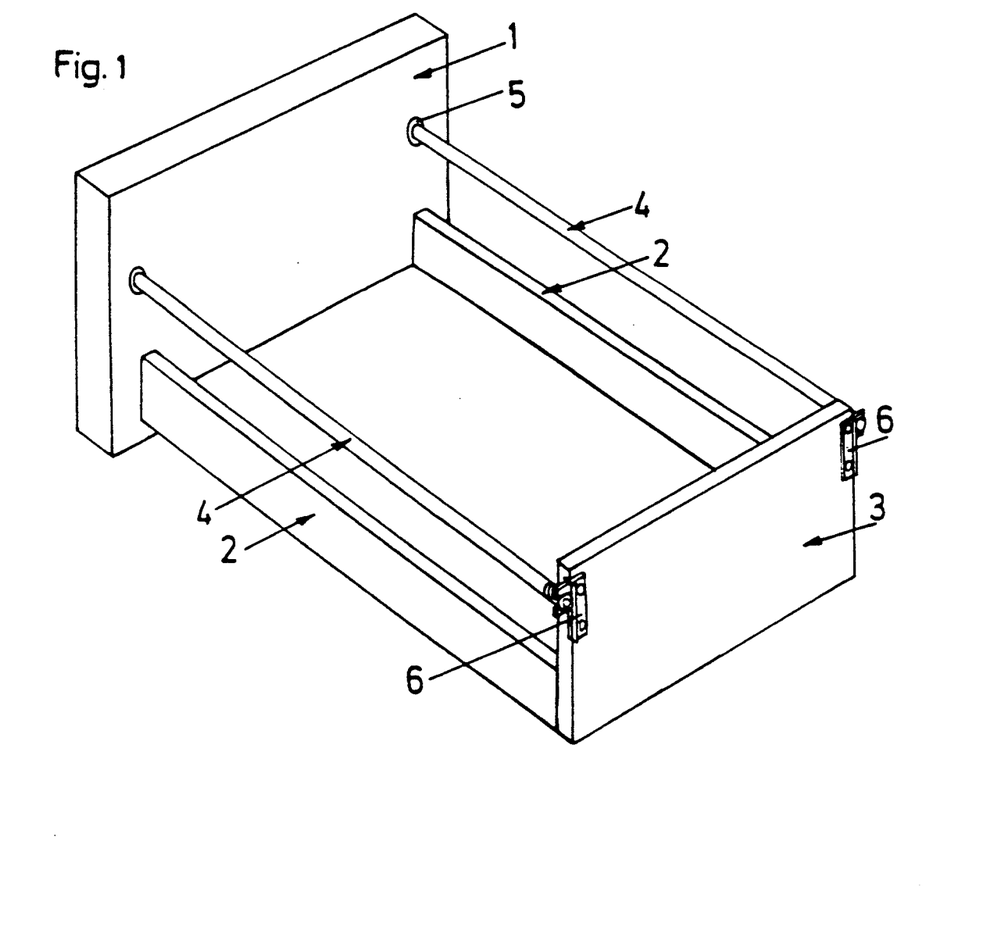
FIG. 1 is a perspective view of a drawer.

As can be seen from FIG. 1, a front panel of a drawer is designated 1, a rear wall is designated 3 and drawer side frames are designated 2. On each side of the drawer above the respective drawer frame there is provided a rail 4. Each rail 4 is secured by means of a connecting fitting 5 to the front panel 1. On each side, a plate-like supporting member 6 is screwed to the rear wall 3 of the drawer.

Figure 8:
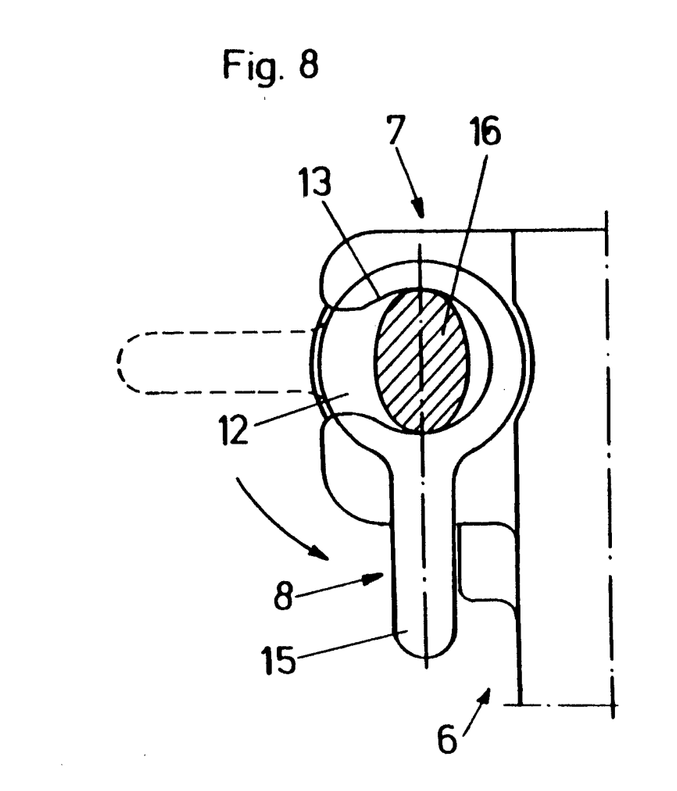
FIG. 8 is a section along line VIII—VIII in FIG. 7.
Figure 9:
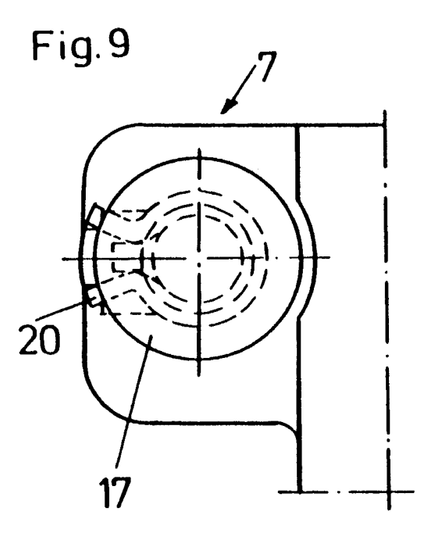
FIG. 9 is an end view, from the right side of FIG. 10 of another embodiment.
Figure 10:
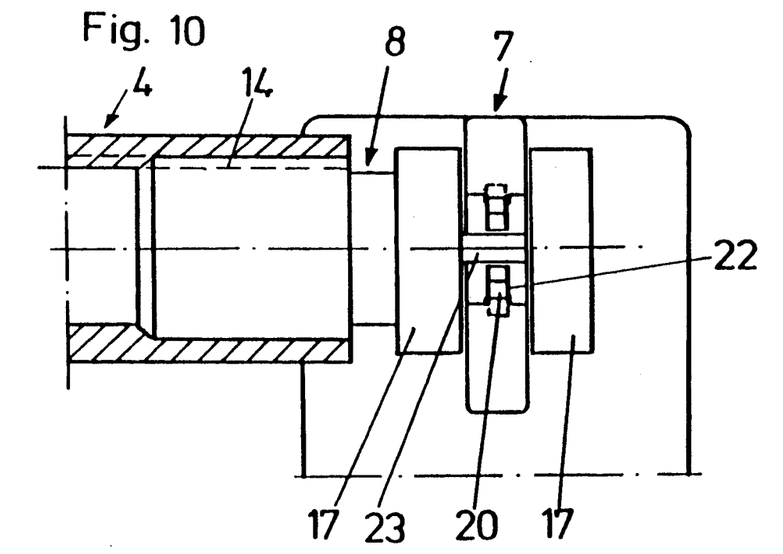
FIG. 10 is a side view of the embodiment of FIG. 9.
Figure 11:
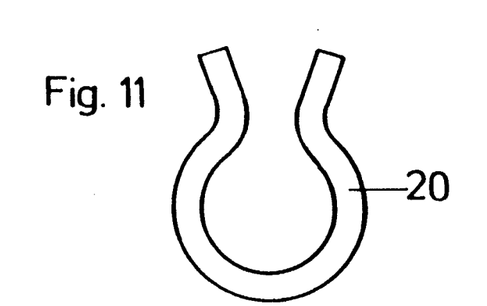
FIG. 11 is an elevation view of a ring spring employed in such embodiment.
Figure 12:
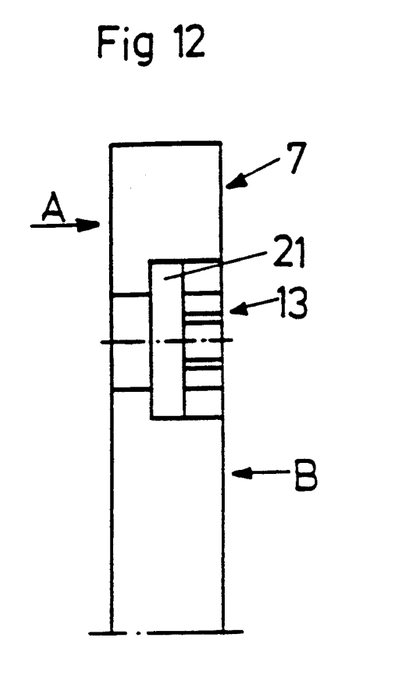
FIG. 12 is a side view of the anchoring portion.
Figure 13:
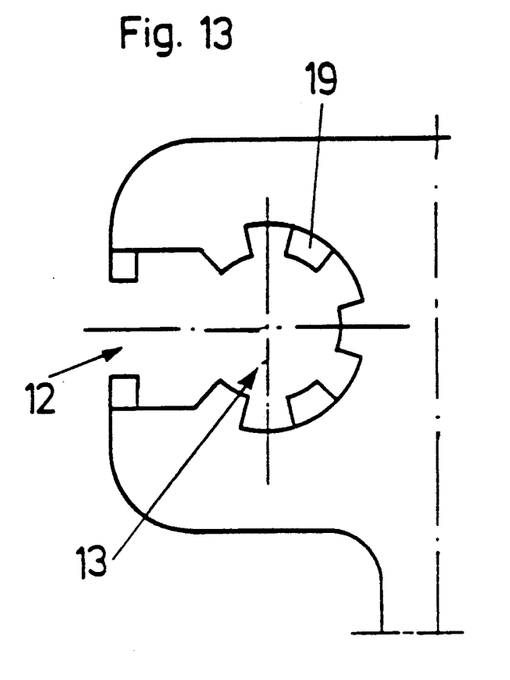
FIG. 13 is an end view from the direction of an arrow B in FIG. 12.
Figure 14:
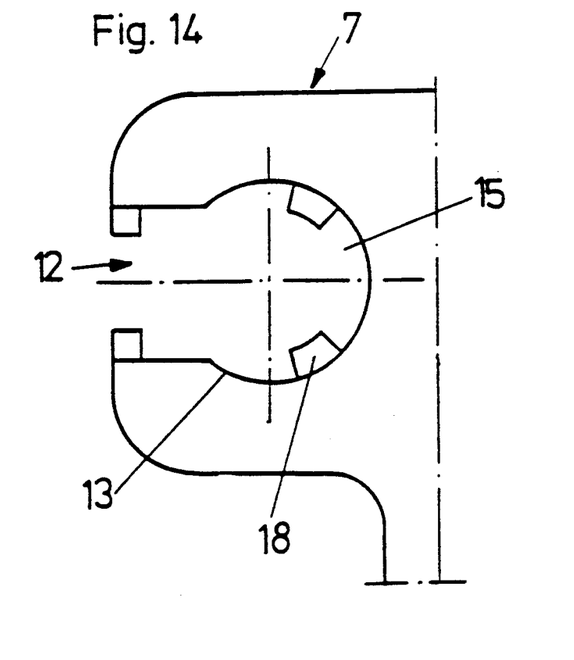
FIG. 14 is an end view from the direction of an arrow A in FIG. 12.

The plate-like supporting member has a laterally projecting anchoring portion 7 in which the railing 4 is suspended by means of a securing element 8 (see FIG. 8). The supporting member 6 is provided with two lateral webs 9, a respective one of which bears against the end side of the rear wall 3, so that the supporting part 6 is correctly positioned. As can be seen particularly from FIG. 3, the supporting member 6 is of symmetrical construction when viewed from the side of the drawer, so that the same member can be fixed to the rear wall 3 either on the right or on the left sides thereof. To secure the supporting member 6, there are provided therein holes 10 which are countersunk on both sides at 11. The anchoring portion 7 has therein an open slot 12 and a receiving opening 13 for the securing element 8.

The securing element 8 has a threaded section or portion 14 which is received in threads in the rail 4. By means of the threaded section 14, the securing element 8 may be screwed into the rail 4 to a greater or lesser extent, so that differences in the spacing between the front panel 1 and the rear wall 3 may be compensated. Similarly, the inclination of the front panel 1 may be adjusted.

Figure 2:
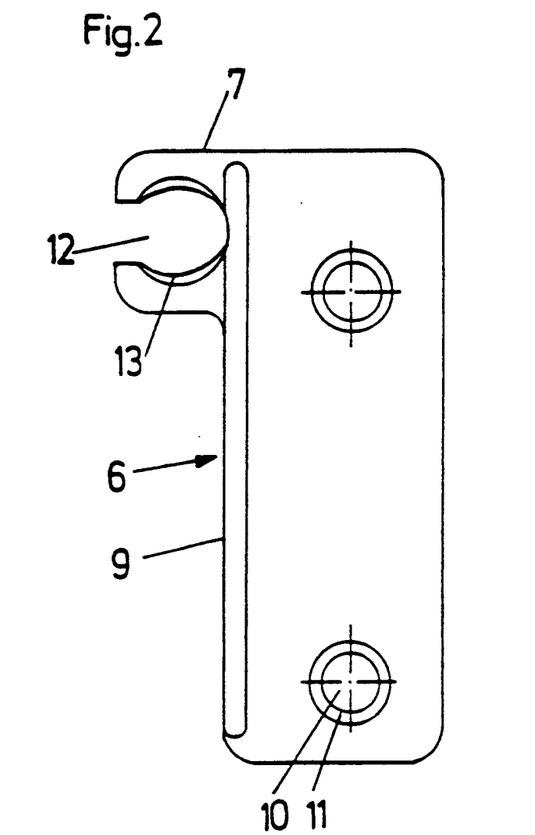
FIG. 2 is an elevation view of a supporting member.
Figure 3:
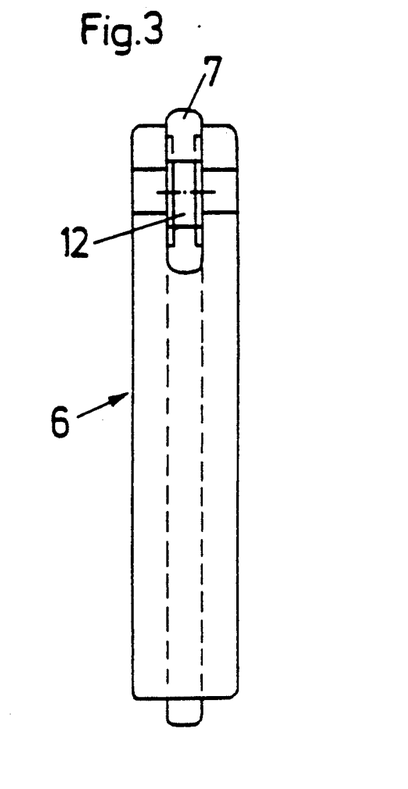
FIG. 3 is a side view of the supporting member.
Figure 4:
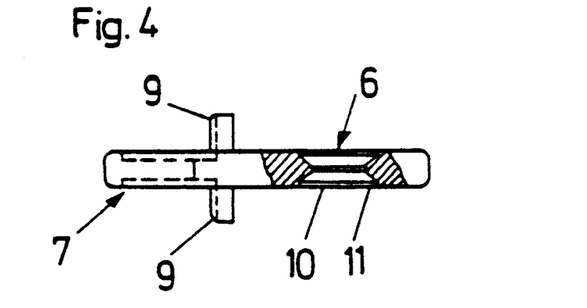
FIG. 4 is a plan view of the supporting member, shown partially in section.
Figure 5:
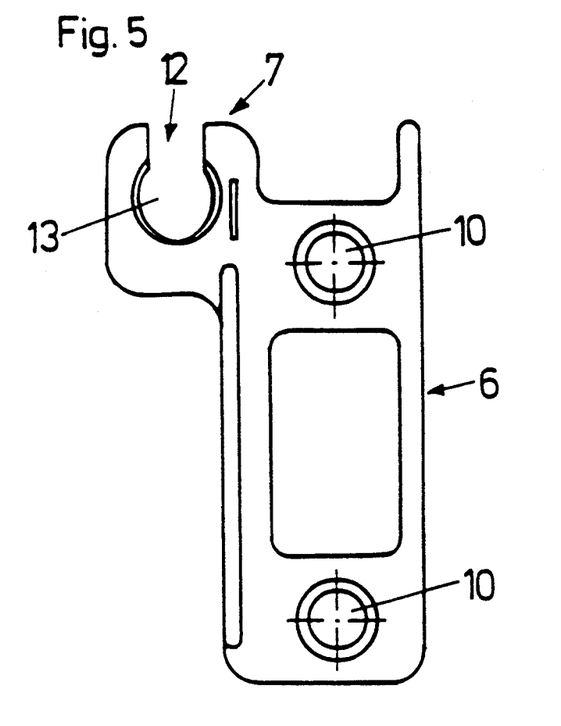
FIG. 5 is an elevation view of a further embodiment of a supporting member.
Figure 6:
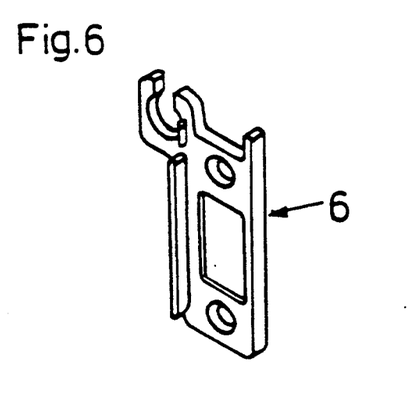
FIG. 6 is a perspective view of the supporting member according to FIG. 5.

The slot 12 may be directed to the side, as shown in FIGS. 2-4, as well as upwardly, as shown in FIGS. 5 and 6. If the slot 12 is directed upwardly, it is also possible to mount the rail 4 suspended in the drawer, since the securing element 8 can be pressed into the supporting member 6 from above.

Figure 7:
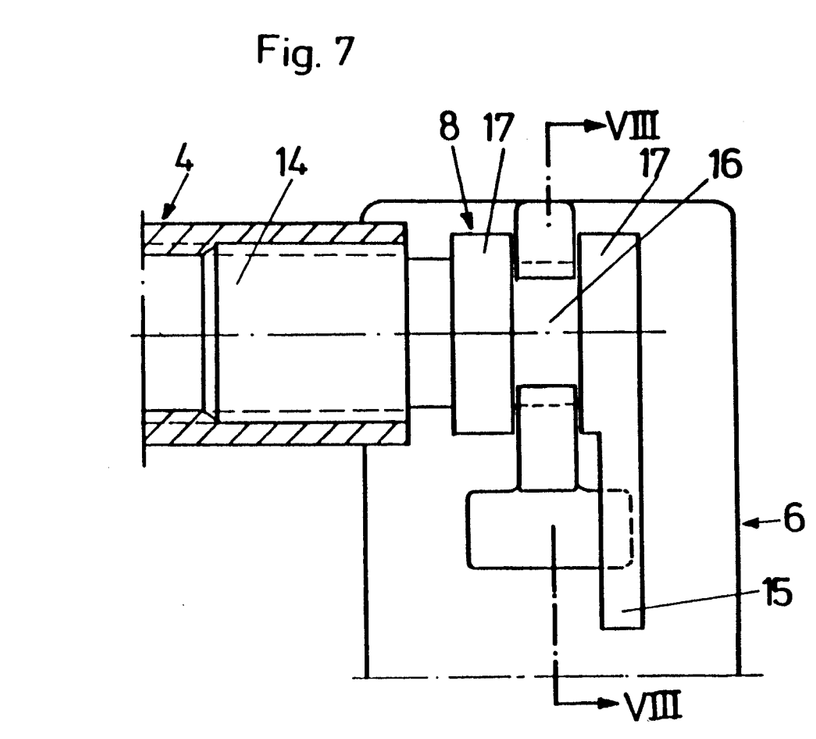
FIG. 7 is a view of a secured rail, with the supporting member and a connecting fitting being shown in elevation and the rail being shown in section.

In the embodiment in accordance with FIGS. 7 and 8, the securing element 8 is provided with an oval section or portion 16 located between two flange-like portions 17. Furthermore, the securing element 8 includes a handle 15 integral with and extending from that flange-like portion 17 furthest from rail 4.

For assembly, section 16 of the securing element 8 is oriented in the position shown by dotted lines in FIG. 8 and then is pushed through the slot 12 into the receiving opening 13. The securing element 8 then is rotated by means of the handle 15 so that the oval region 16 is upright and is held and clamped in portion 7 by friction against the surface of opening 13.

In the embodiment in accordance with FIGS. 9 to 14, the portion 7 has a double-walled construction or configuration in the region of the receiving opening 13. Thus, extending inwardly into opening 13, at opposite axial ends thereof, are tooth-like projections 18 and 19 which delimit between them a slot or receiver 21 for a substantially C-shaped spring ring 20. The spring ring 20 may be snapped into the gap-like slot or receiver 21 between the tooth-like projections 18 and 19. The securing element 8 has a tapered section or groove 22 into which fits the spring ring 20 when securing element 8 is pushed into the spring ring 20 and thus into the receiving opening 13 of the part 7. The securing element 8 is provided with a nose or projection 23 which prevents the securing element 8 from moving with the rail 4 when the latter is rotated.

Figures 15, 16, 17:
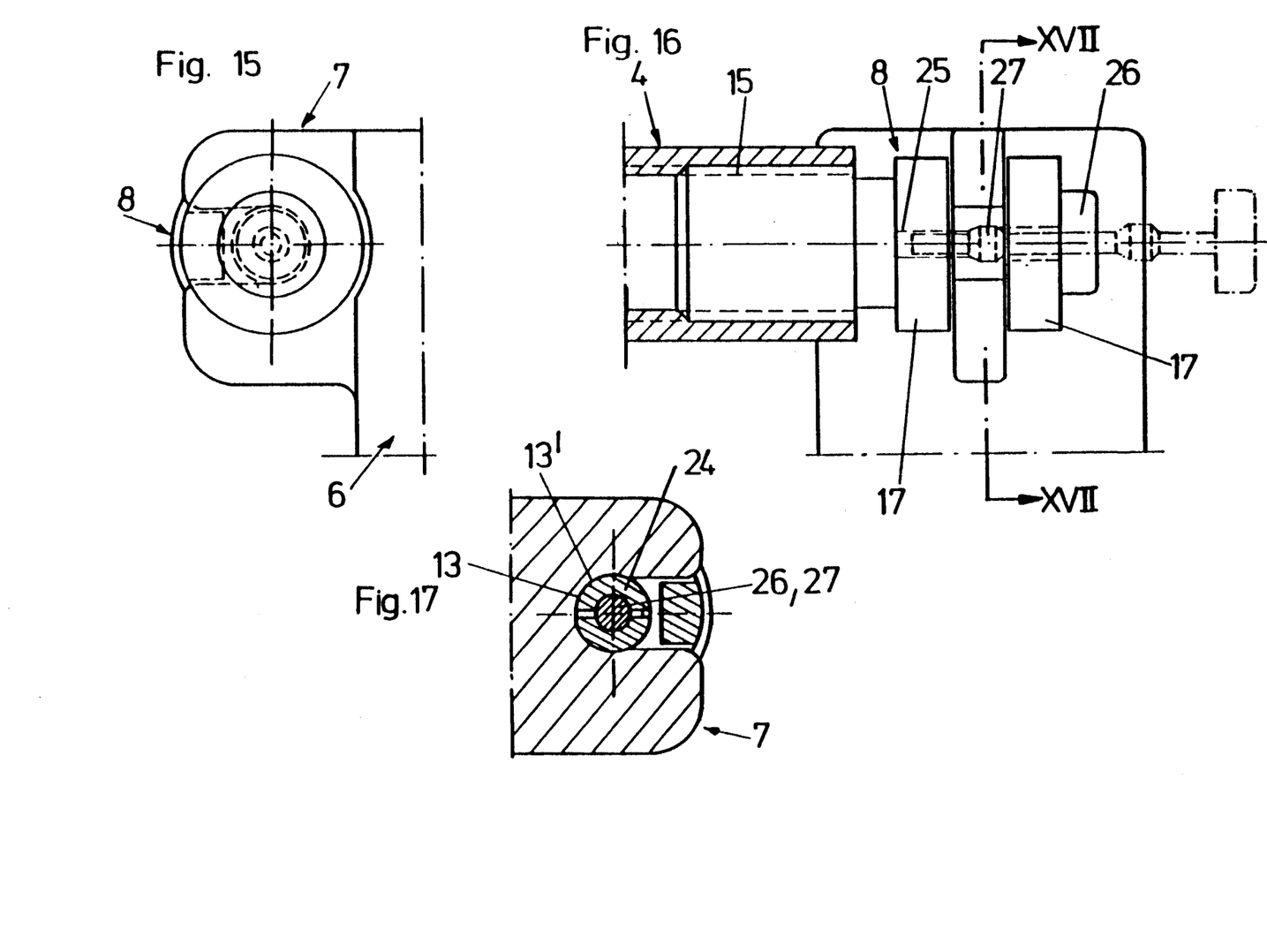
FIG. 15 is an end view of a further embodiment.
FIG. 16 is a side view in accordance with FIG. 15.
FIG. 17 is a section along line XVII—XVII in FIG. 16.

In the embodiment in accordance with FIGS. 15 to 17, the securing part 8 is provided with separable or spreadable portions 24. The securing element 8 also has therethrough an axial central channel 25 in which a spreading pin 26 may be inserted. The spreading pin 26 has a bulge or widened section 27 which presses the spreadable portions 24 apart and against the wall 13, of the receiving opening 13.

Figure 18:
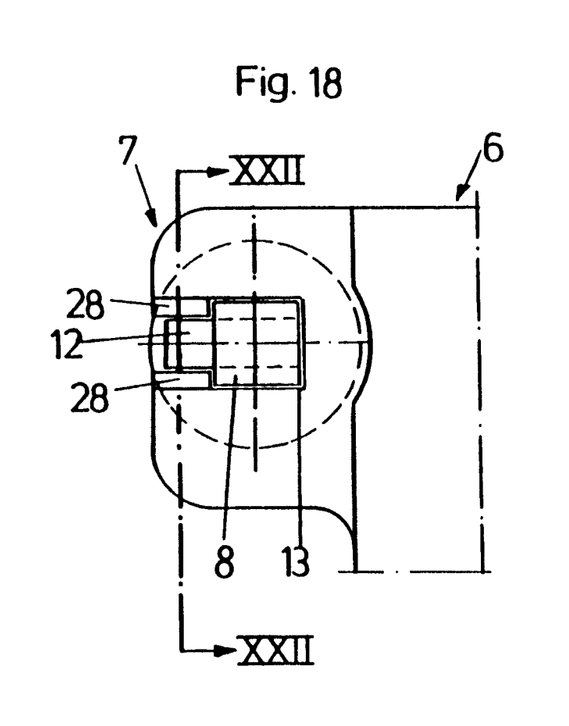
FIG. 18 is an end view of a still further embodiment.
Figure 19:
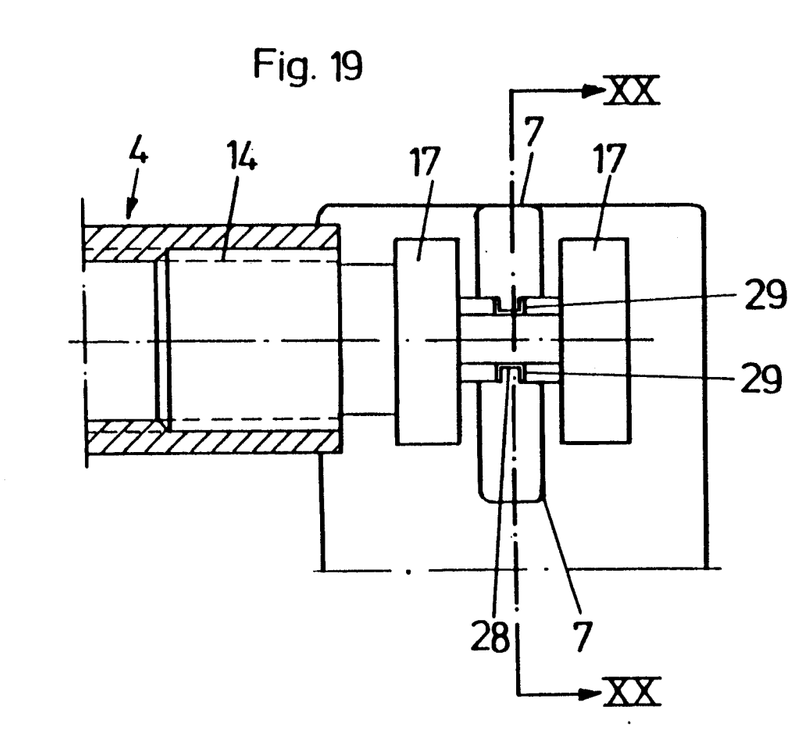
FIG. 19 is a side view in accordance with FIG. 18.
Figure 20:
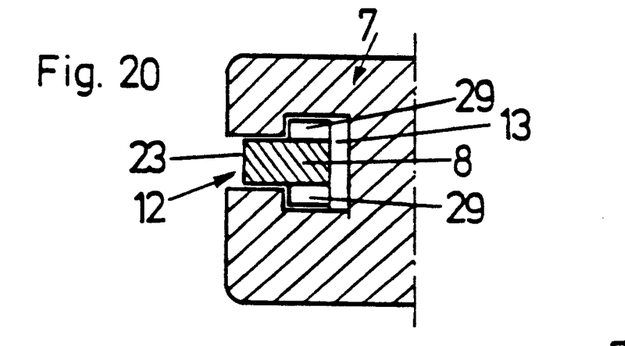
Figures 21, 22, 23:
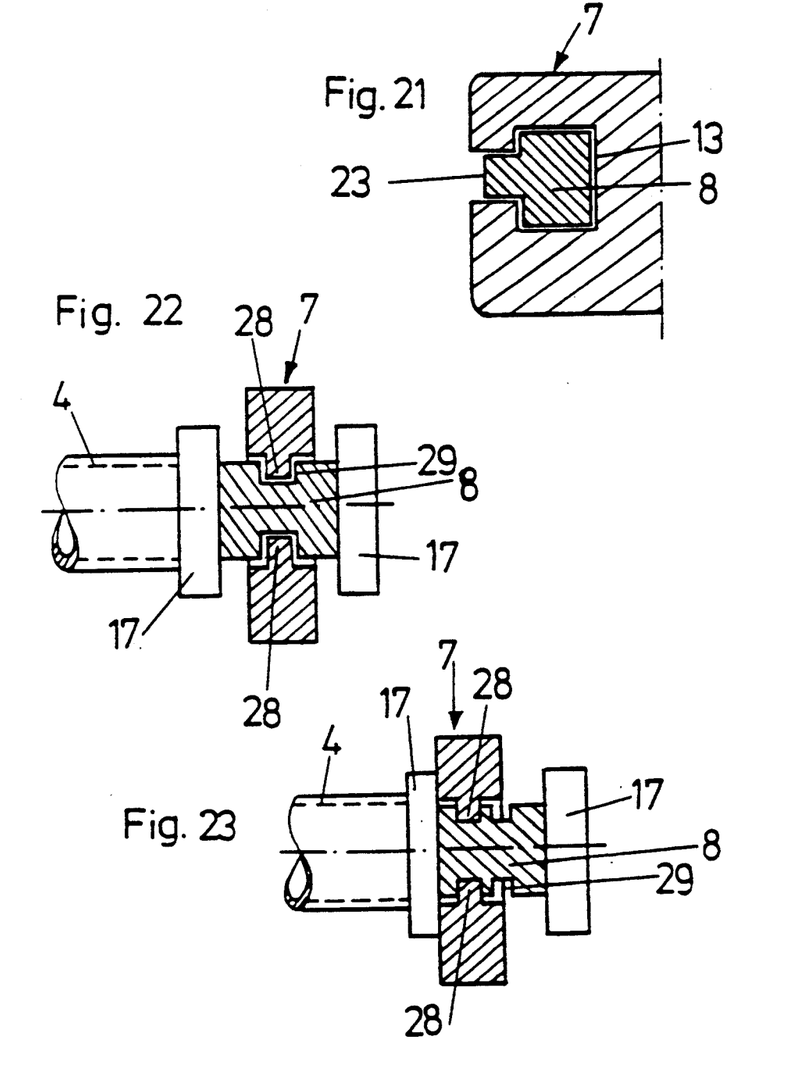

In the embodiment in accordance with FIGS. 18 and 19, projections 28 extend from portion 7 into the slot 12, and are received in complementary grooves 29 in securing element 8. For assembly, the securing part 8 is pressed, as in the previous embodiments, through the slot 12 into the receiving opening 13, during which the projections 28 are guided through the grooves 29. Then, the securing element 8 is displaced axially, advantageously to such an extent that one of the flange-like portions 17 snugly bears against the portion 7 of the supporting member 6. This can be achieved by rotating the rail 4, whereby the desired spacing section with respect to the front panel 1 is produced and the securing element 8 can no longer be moved out of the receiving opening 13 through the slot 12. In this embodiment, the securing element 8 also is provided with a projection 23 which prevents the securing element 8 from being turned with the rail 4 when the latter is rotated.

We claim:

1. A connecting fitting for fastening a rear end of a rail of a drawer to a rear wall or side wall of the drawer, said fitting comprising:

a supporting member to be fastened to the rear wall or side wall of the drawer, said supporting member having therethrough a receiving opening and an open-ended slot, said receiving opening being substantially circular in cross section, said slot opening into said receiving opening and having a width smaller than the size of said receiving opening, such that said slot widens into said receiving opening;

a securing element for connecting the rear end of the rail to said supporting member, said securing element including a first portion to be fastened to the rear end of the rail and a second portion dimensioned to fit in said slot, such that said second portion may be inserted through said slot into said receiving opening to thereby suspend said securing element from said supporting member;

said second portion of said securing element having a non-circular cross section frictionally engaging said supporting element internally of said receiving opening, such that rotation of said second portion within said receiving opening locks said second portion therein due to frictional contact between a surface of said second portion against a surface defining said receiving opening, thereby releasably retaining said second portion of said securing element with said receiving opening; and said securing element further including a pair of flanges at respective opposite ends of said second portion, and a lever integrally extending from one of said flanges, by which said securing element may be rotated to thereby rotate said second portion within said receiving opening.

2. A fitting as claimed in claim 1, wherein said non-circular cross section is oval.

3. A fitting as claimed in claim 1, wherein said first portion of said securing element is constructed to fit within the rear end of the rail.

4. A fitting as claimed in claim 1, wherein said first portion of said securing element is threaded to mesh with threads of the rear end of the rail.

5. A fitting as claimed in claim 1, wherein said slot is positioned to open upwardly when said fitting is assembled to the drawer.

6. A fitting as claimed in claim 1, wherein said slot is positioned to open laterally when said fitting is assembled to the drawer.

7. A fitting as claimed in claim 1, wherein said second portion of said securing element has a lateral projection extending into said slot.

8. A fitting as claimed in claim 1, wherein said first and second portions of said securing element comprise an integral, one-piece structure.

* * * * *